United States Patent
Blenke

(10) Patent No.: US 10,682,803 B2
(45) Date of Patent: Jun. 16, 2020

(54) METHOD AND APPARATUS FOR PRODUCING A LINER HOSE FOR PIPES

(71) Applicant: Brandenburger Patentverwertung GbR, Landau (DE)

(72) Inventor: Stefan Blenke, Landau (DE)

(73) Assignee: Brandenburger Patentverwertung GbR, Landau (DE)

( * ) Notice: Subject to any disclaimer, the term of this patent is extended or adjusted under 35 U.S.C. 154(b) by 261 days.

(21) Appl. No.: 15/765,804

(22) PCT Filed: Jul. 28, 2016

(86) PCT No.: PCT/EP2016/001304
§ 371 (c)(1),
(2) Date: Apr. 4, 2018

(87) PCT Pub. No.: WO2017/059937
PCT Pub. Date: Apr. 13, 2017

(65) Prior Publication Data
US 2018/0281270 A1      Oct. 4, 2018

(30) Foreign Application Priority Data
Oct. 5, 2015   (DE) .................. 10 2015 012 791

(51) Int. Cl.
*B29C 53/60*   (2006.01)
*B29C 53/68*   (2006.01)
(Continued)

(52) U.S. Cl.
CPC ............ *B29C 53/607* (2013.01); *B29C 53/68* (2013.01); *B29C 63/34* (2013.01); *B29C 53/385* (2013.01);
(Continued)

(58) Field of Classification Search
CPC ...... B29C 53/385; B29C 53/44; B29C 53/581; B29C 53/607; B29C 53/68; B29C 53/32;
(Continued)

(56) References Cited

U.S. PATENT DOCUMENTS

| | | | | |
|---|---|---|---|---|
| 3,058,642 A | * | 10/1962 | Hester ................ | B29C 65/568 229/125.14 |
| 3,769,127 A | * | 10/1973 | Goldsworthy ........ | B29C 70/521 156/172 |
| 4,053,343 A | * | 10/1977 | Carter .................. | B29C 53/56 156/172 |
| 4,119,748 A | * | 10/1978 | Verbauwhede ........... | F16L 9/16 428/34.5 |
| 4,783,232 A | * | 11/1988 | Carbone ................. | B29C 53/66 156/172 |

(Continued)

FOREIGN PATENT DOCUMENTS

DE      198 23 714       7/2000

OTHER PUBLICATIONS

International Search Report from PCT/EP2016/001304 dated Nov. 2, 2016.

(Continued)

*Primary Examiner* — Emmanuel M Marcelo
(74) *Attorney, Agent, or Firm* — Melger IP Law; Tod M. Melgar

(57) ABSTRACT

Method and apparatus for producing a liner hose (30) for lining channels and pipes, comprising a circumferentially closed inner film hose (32) and at least on fibrous strip (34) wound onto the inner film hose (32) and impregnated with a curable reaction resin, wherein the inner film hose (32) is drawn in a winding apparatus (40) onto a support tube (8) which is mounted on one side and arranged substantially horizontally, at the free end (10) of which a winding mandrel (12) is arranged having a transport apparatus (16) which, (Continued)

Figure 1:
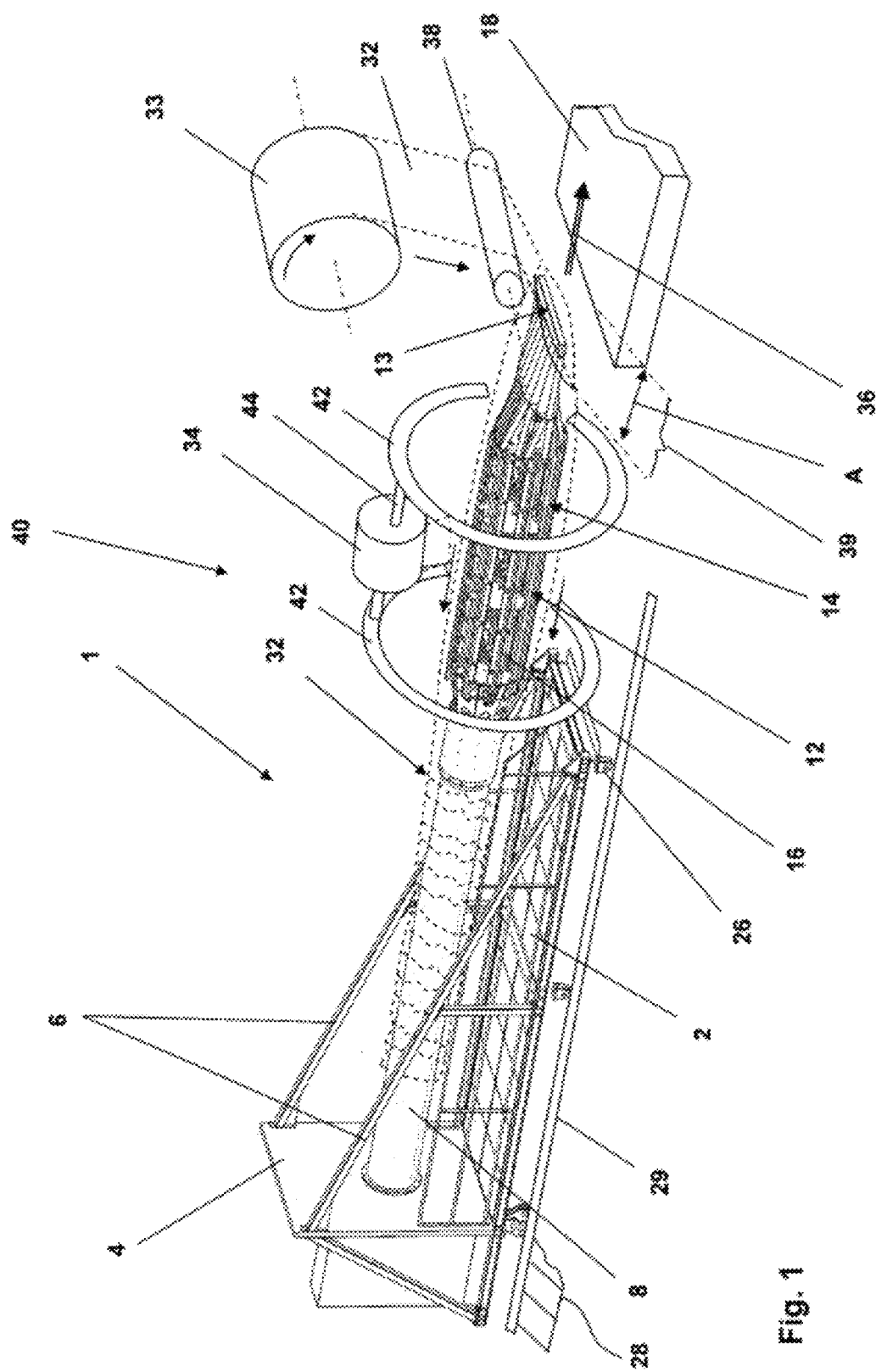

during the circumferential winding of the fiber strips (34), transports the inner film hose (32) in a feed direction (36) to a stationary supporting surface (18) which is arranged at the free end (10) of the winding mandrel (12) and over which the liner hose (30) is conveyed further, wherein the inner film hose (32) is drawn over the free end (13) of the winding mandrel (12) onto the support tube (8) against the feed direction (36).

14 Claims, 3 Drawing Sheets

(51) Int. Cl.
  *B29C 63/34* (2006.01)
  *B29L 23/00* (2006.01)
  *B29C 53/38* (2006.01)
  *F16L 55/165* (2006.01)
(52) U.S. Cl.
  CPC ..... *B29L 2023/006* (2013.01); *F16L 55/1654* (2013.01); *F16L 55/1656* (2013.01)
(58) Field of Classification Search
  CPC .. B29C 53/345; F16L 55/1654; F16L 55/1656
  USPC ........................................................ 242/438
  See application file for complete search history.

(56) References Cited

U.S. PATENT DOCUMENTS

| | | | | |
|---|---|---|---|---|
| 7,374,127 | B2* | 5/2008 | Gallagher | F16L 55/1652 242/438 |
| 7,810,753 | B2* | 10/2010 | Uozumi | B29C 53/66 242/438 |
| 7,810,754 | B2* | 10/2010 | Uozumi | B29C 53/602 242/437 |
| 7,815,141 | B2* | 10/2010 | Uozumi | B29C 53/602 242/438 |
| 7,837,139 | B2* | 11/2010 | Franchet | B23P 15/00 242/438 |
| 8,113,457 | B2* | 2/2012 | Tanigawa | B29C 53/602 242/438 |
| 2014/0037877 | A1* | 2/2014 | Martin | B29C 66/723 428/36.1 |
| 2015/0068636 | A1* | 3/2015 | Duttenhoefer | B32B 37/142 138/137 |
| 2017/0138512 | A1* | 5/2017 | Duttenhofer | B29C 33/444 |

OTHER PUBLICATIONS

Written Opinion of the International Search Authority for PCT/EP2016/001304 dated Nov. 2, 2016.
Machine translation of DE19823714.

* cited by examiner

METHOD AND APPARATUS FOR PRODUCING A LINER HOSE FOR PIPES

This application is based on International Application No. PCT/EP2016/001304 filed on Jul. 28, 2016, which claims priority to German Patent Application No. DE 10 2015 012 791.8 filed on Oct. 5, 2015, the entire contents of which are incorporated herein by reference.

The disclosure concerns a method for producing a liner hose for lining pipes as well as an apparatus for carrying out the method pursuant to the recited claims.

In the field of trenchless renewal of damaged sewer pipes, increasing use is being made of liner hoses (referred to as "inliners"), which are made of a fibrous material, particularly fiberglass cloth impregnated with a liquid reaction resin; the liner hose is pulled into the pipe and then expanded using compressed air, after which the resin is cured using light from a radiation source.

Such a liner hose as well as a method and an apparatus for producing such hose are known, for example, from DE 19823714C2.

The liner hose is produced by winding the resin-impregnated fiber strips, overlapping one another, in a winding apparatus, onto an inner film hose which is permeable to UV light and which has been pulled onto a cantilevered support tube on the end of which a winding mandrel is located over which the inner film hose is drawn during the winding process.

In the winding apparatus described therein, it is problematic that the end of the support tube opposite the winding mandrel is supported by a total of two rams each of which has a clamping apparatus which act from above and from below onto the support tube. In order to draw the extremely sensitive inner film hose onto the support tube, the same is drawn by alternatingly opening and closing the clamping devices by sections from the end of the tube opposite the winding mandrels onto the same, wherein it is necessarily required to squeeze the inner film hose between the external surface of the support tube and the clamping apparatus. Based on the high weight of the winding mandrel and the length of the support tube, this results in high mechanical stresses on the inner film hose. In addition, drawing the inner film hoses through the clamping apparatuses is very time-consuming and can generally only be carried out by two or more persons. In this respect, the main difficulty is that the part of the support tube, adjacent to the winding mandrel, that serves as a storage area for the hose during the winding process is comparatively short; as a result, the length of the support tube that is available for storing the part of the hose that can be used for the winding process is greatly limited. Considering that the winding process—and therefore the production of the liner hose—must be interrupted each and every time the next section of the inner film hose is pushed through the clamping apparatus onto the partial section of the support tube located on the side of the winding mandrel, the production speed for the described apparatus is significantly lower as a result of constant interruptions of the winding process than the maximum production speed which can be achieved in the case of continuous production.

Accordingly, one object of this present invention is to provide a method for the production of a wound liner hose for lining pipes which permits a higher production speed.

According to the disclosure, this object may be resolved in one embodiment by a method for producing a liner hose (30) comprising drawing an inner film hose (32) against a feed direction, over a free end of a winding apparatus (40) comprising a winding mandrel (12) with a transport apparatus (16) mounted on a free end (10) of a cantilevered support tube (8), wherein the inner film hose is circumferentially closed; transporting the inner film hose (32) in a feed direction with the transport apparatus (16); circumferentially winding at least one fiber strip (34) around the inner film hose (32) while transporting the inner film hose (32) in the feed direction, wherein the fiber strip (34) is impregnated with a curable resin; and receiving the inner film hose (32) with wound fiber strip (34) on a stationary supporting surface (18) proximate to a free end (13) of the winding mandrel.

Furthermore, it is one object of this present invention to create an apparatus for the performance of the method based on which a liner hose wound by using resin-impregnated fiber strips can be produced at a high speed and with high quality.

According to the disclosure, this object may be resolved by an apparatus for the performance of the method wherein in one embodiment a liner tube winding system is provided, comprising a substantially horizontally arranged floor element (2); a substantially vertically extending holding plate (4) mounted to the floor element (2); at least one support element (6) connected between the floor element (2) and holding plate (6); a support tube (8) having a mounted end and a free end (10) wherein the mounted end is attached to the holding plate (4) and extends in a cantilevered manner to a free end (10); a winding mandrel (12) mounted to the free end (10) of the support tube (8) wherein the winding mandrel (12) includes a rotatable transport apparatus (16) accommodated in a circumferential surface (14).

Other characteristics of the invention are described in the subclaims.

According to the invention, within the scope of a method for the production of a liner hose for lining pipes, at least one layer made from fiber strips that are impregnated with a reaction resin which is cured, preferably by using light, in particular UV light is wound onto an inner film hose which is preferably permeable to UV light. Alternatively, however, the reaction resin may be a known reaction resin that can also be cured through heat, for example by means of vapor or hot water, or through ionizing or other electromagnetic radiation, or which can also be cured chemically, for example through the addition of a suitable curing agent.

In the process, the inner film hose is pulled onto a cantilevered support tube on the end of which a winding mandrel with a transport apparatus made from preferably several rotating transport strips is arranged. The transport apparatus conveys the inner film hose during initial winding of the fiber strips continuously with a pre-specified speed in the feed direction, defined by the direction of rotation of the transport strips, to a stationary supporting surface which is located on the free end of the winding mandrel opposite of the same. Over and beyond the supporting surface, the liner hose made up of the inner film hose and the fibrous material, as well as possibly other layers, is pulled off the winding mandrel and conveyed further in order to apply at least another external layer to the layer made from fibrous material, if desired, for example a material which is permeable to UV light.

The method according to the invention is characterized in that the inner film hose is pulled onto the support tube over the free end of the winding mandrel against the feed direction. This creates the advantage that the inner film hose is exposed to almost no mechanical stresses, as a result of which the risk of mechanically caused leaks in the inner film hose are significantly reduced. As a result of such leaks, generally, during installation of the liner hose in the channel to be renewed using compressed air, the compressed air escapes through the leak. As a result, the reaction resin, which is still liquid, is expelled from the fibrous material, and in the worst case, the liner hose in the channel collapses and surrounds and cures the UV light source during the radiation process. In any case, however, a leak in the inner film hose significantly reduces the strength and carrying ability of the cured fibrous material due to the resin being expelled and, consequently, the fluid tightness of the liner hose cannot be guaranteed.

Although the drawing of the inner film hose can basically also be exclusively carried out by hand, within the scope of the method according to the invention, preferably, the transport apparatus is driven, during the process of drawing the inner film hoses onto the support tube, in the opposite direction, meaning in the direction other than in the actual direction of transport during the winding operation, in order to support the drawing operation or to carry out the same in a fully automated manner. This leads to a significant reduction of the required time or the number of required personnel, considering that only one person is necessary to draw the film hose onto the support tube.

According to another idea on which the invention is based, in addition, the inner film hose may be rolled up as goods supplied by the meter on a roll and, from the roll, via at least one deflection roller, it is guided into the gap area located between the supporting surface and the free end of the winding mandrel which, during drawing of the inner film hose, may, for example, have a width of 10 cm to 100 cm or even more. The width of the gap can preferably be adjusted by moving the associated apparatus for the performance of the method in respect of the supporting surface, wherein the distance is preferably increased in order to draw the inner film hose prior to the actual winding process in order to ensure undisturbed feeding of the inner film hose to the tip of the winding mandrel.

To ensure that the height between the tip of the winding mandrel and the supporting surface during the actual winding process is always adjusted so that the tip of the winding mandrel and the top side of the supporting surface are flush with each other, which may vary in the range of some centimeters due to the bending of the cantilevered support tube from different weight liner hoses, the angle of inclination of the support tube can preferably be adjusted in respect of the horizontal.

In order to furthermore ensure, within the scope of the method according to the invention, the most careful transportation possible of the inner film hose both while drawing it onto the support tube as well as while pulling it off the support tube during the actual winding process, based on another idea on which the invention is based, on the surface of the winding mandrel and/or the support tube, an air cushion is generated on which the inner film hose is preferably moved almost without any friction. For such purpose, in the circumferential surface of the support tube and/or the winding mandrel itself, air nozzles may be provided which are supplied by a source of compressed air.

Furthermore, a winding apparatus which permits the performance of the above-described method comprises a substantially horizontally arranged floor element as well as a holding plate which is mounted on the same and which substantially extends vertically. The holding plate is supported, in respect of the floor element, by preferably two or even more support elements, in particular diagonally extending cross braces, to support it in its vertical or substantially vertical position. On the holding plate, the already mentioned support tube is mounted in a cantilevered manner, and on its free end, the winding mandrel is preferably mounted as a separate component. The winding mandrel, which is preferably connected in a detachable manner via bolts or also a quick connection, for example a bayonet joint, on the free end of the support tube, has, on its circumferential surface, a transport apparatus which transports the inner film hose during the winding process in the feed direction of the liner hose away from the winding mandrel. The transport apparatus comprises at least one, although preferably several, for example four, six, or more, continuously rotating transport strips which are driven by a drive disposed inside the winding mandrel, preferably an electric motor. As already stated earlier, at a distance from the winding mandrel, a stationary supporting surface is provided against which the liner hose consisting of the inner film hose as well as the wound-up fiber strips is supported during its onward transportation.

In the preferred embodiment of the apparatus according to the invention, to accommodate the support tube which, based on the weight of the winding mandrel as well as its significant greater length compared with existing state-of-the-art winding apparatuses, which, for example, may be in the range from 3 to 8 meters, inside the support tube, at least one rod-shaped tensioning element is supported, on one end, by the inside wall or a front-side plate of the support tube and on the other end by the holding plate itself. The tensioning element may, for example, be provided by a traction cable or solid longitudinal rod and is preferably made from a high-strength material, for example from stainless steel or also from a carbon fiber material.

The use of such a tensioning element, whose length and tension, for example, can be adjusted via bolts screwed onto the outside of the holding plate in a respective thread section, is advantageous insofar as that liner hoses with different diameters and wall thicknesses can be manufactured using one and the same support tube, considering that the different degrees of bending of the support tube as a result of different weight forces can be compensated in a simple manner by increasing or decreasing the tension in the tensioning elements.

According to another embodiment of the invention, the floor element is supported via one or several height-adjustable support elements, in particular via at least two height-adjustable support rollers, on the ground to be able to change the inclination of the floor element with respect to the horizontal. This is advantageous insofar as the winding mandrel can be tilted, during the winding process, substantially horizontally or at a pre-specified angle in a downward direction, as a result of which it is ensured that the liner hose, during the winding process, does not need to be transported in an upward direction on the winding mandrel through the transport apparatus.

According to another idea on which the invention is based, on the floor element, at least one drive wheel which is driven by a motor, preferably an electric motor and a transmission, is arranged, which can be used to move the entire apparatus back and forth, preferably on rails. This creates the possibility that the apparatus according to the invention, which, for example, may weigh up to 12 tons, can be moved by one single person, after completion of a winding process, away from the supporting surface and into a changing position in order to replace the winding mandrel, after releasing the bolt connection or the quick connection, by a winding mandrel with another diameter.

As already mentioned earlier in connection with the method according to the invention, the rotating transport strips of the transport apparatus are preferably driven by an electrical drive motor which is preferably located inside the support tube and which preferably drives the winding mandrel via a shaft and whose direction of rotation and number of revolutions can be adjusted using a respective drive control system in order to reverse the direction of transportation and to set the feeding speed to a pre-specified value.

The invention will be described below with reference to the drawings.

Figure 2:
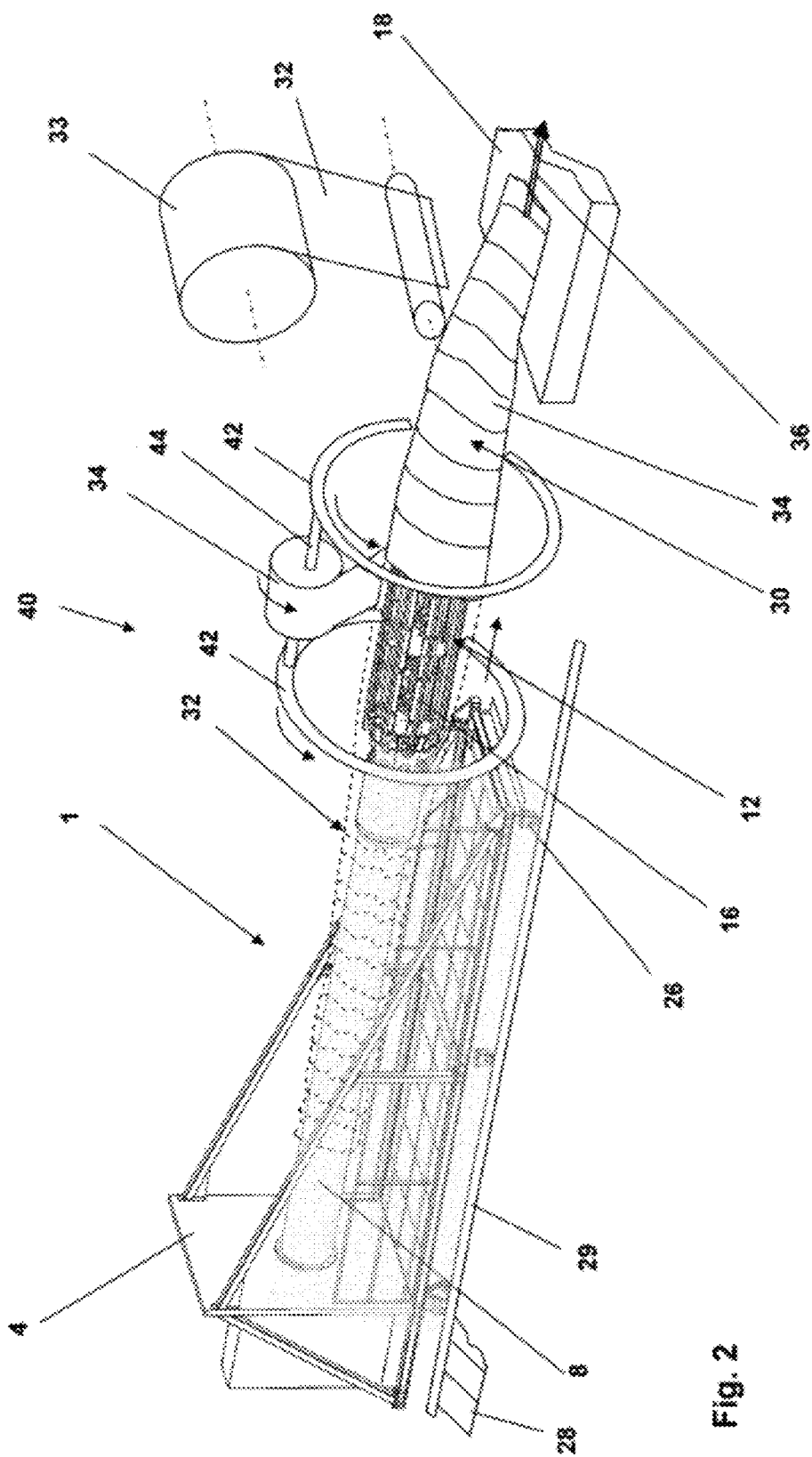
Figure 3:
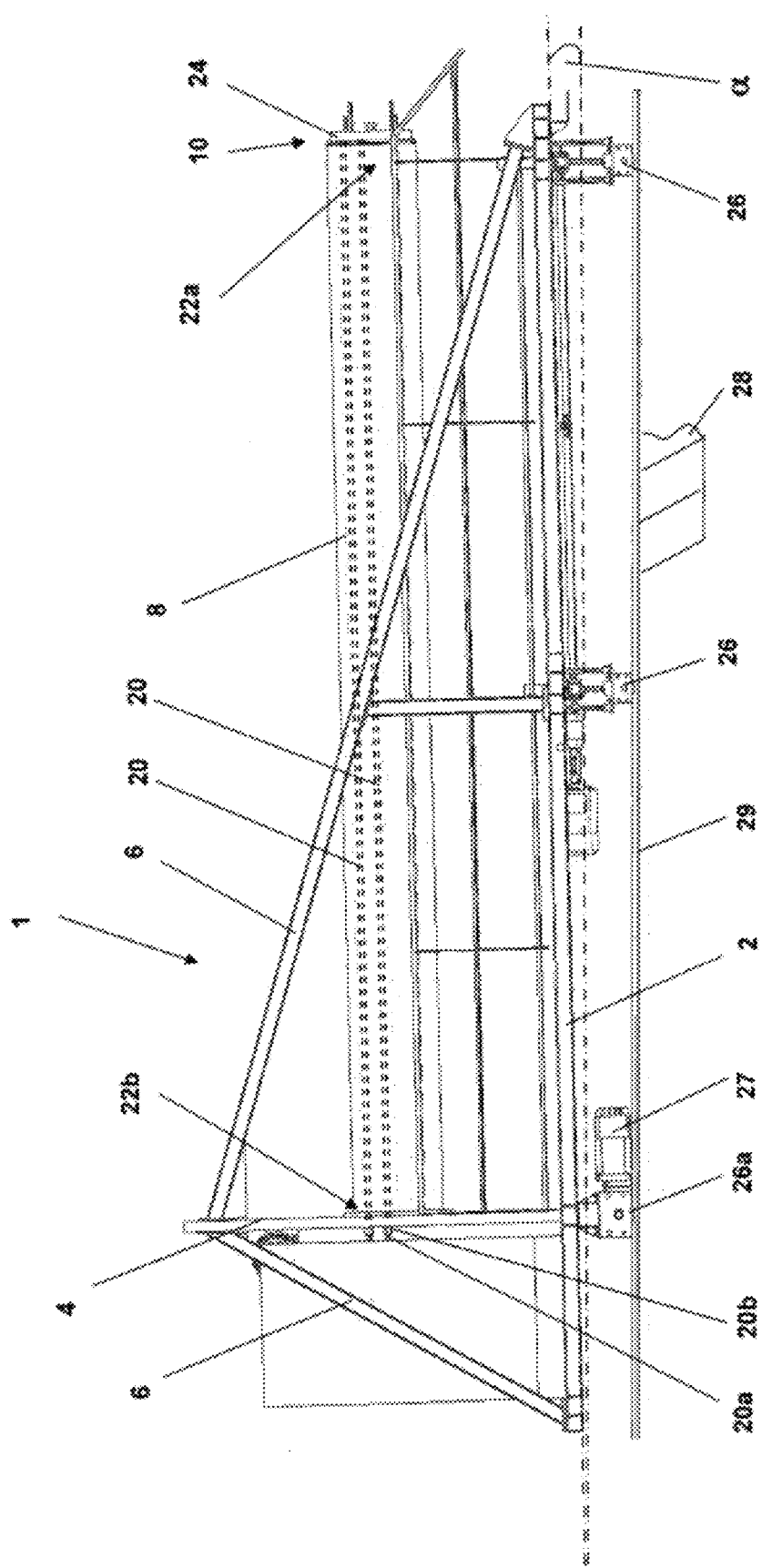

The drawings show the following:

FIG. 1 is a schematic spatial representation of the apparatus according to the invention with a winding apparatus, indicated by sections, while drawing the inner film hose onto the support tube cantilevered on the holding plate, FIG. 2 is a schematic spatial representation of the apparatus according to FIG. 1 during the subsequent winding process, and FIG. 3 is a schematic side view of the apparatus according to the invention according to FIGS. 1 and 2 wherein the winding mandrel has been dismounted and where the tensioning elements are indicated inside the support tube.

As shown in the representation according to FIGS. 1 and 2, an apparatus according to the invention 1 comprises a substantially horizontally arranged floor element 2, which, for example, may be made from steel and onto which a holding plate 4 is mounted and extends substantially vertically from the floor element 2. The holding plate 4 is supported on the floor element 2 via support elements in the form of cross braces 6, shown by way of example, which extend on both sides of the substantially plate-shaped floor element 2 from the upper end of the holding plate 4 at an angle of 30°, for example, in a downward direction to the end of the floor element. On the holding plate 4, a support tube 8 is mounted in a cantilevered manner the free end 10 of which preferably also extends to the end of the floor element 2, as shown in detail in the representation according to FIG. 3. On the free end 10 of the support tube 8, a winding mandrel 12 known from the state of the art is mounted in a detachable manner, which, for example using four threaded bolts, can be connected with the free end 10, onto which a properly designed flange of the winding mandrel 12 can be placed and connected by using threaded nuts. On its circumferential surface 14, the winding mandrel 12 has a transport apparatus which comprises a large number of transport strips 16 distributed over its circumferential surface which is driven by an electrical drive motor located inside the support tube 8, which is not shown in more detail in the drawings for technical reasons.

As furthermore shown by the representation according to FIG. 1, the tip of the winding mandrel is located at a distance A from a stationary supporting surface 18, which is only schematically indicated in FIGS. 1 and 2. In the preferred embodiment of the invention, at least one rod-shaped tensioning element 20 is located inside the support tube 8, and in the area of the free end of the support tube 10 is attached on its end 22a to the inside wall or a front-side plate 24 of the support tube 8 and is attached on its other end 22b to holding plate 4, as indicated in FIG. 3. To adjust the tension within the rod-shaped 30 tensioning element the element has a threaded section 20a, schematically indicated in FIG. 3, that extends through an opening, not specified any further, in the holding plate 4 and onto which a threaded nut 20b has been screwed.

As also shown in the representation according to FIG. 3, the floor element 2 is supported, via height-adjustable support elements in the form of height-adjustable support rollers 26, against the ground 28 in order to be able to adjust the inclination of the floor element 2 or of the support tube 8 which is indicated by the angle α with respect to the horizontal. The support rollers 26 are preferably guided on rails 29 embedded in the ground 28 by means of which the apparatus 1 can be moved back and forth using an electrical drive motor 27 which drives at least one drive wheel 26a arranged preferably in the area below the holding plate 4.

The method according to the invention will be explained in more detail with reference to the representation of FIGS. 1 and 2 below. As shown in FIG. 1, prior to the start of the actual winding process, an inner film hose 32 made from a light-permeable plastic material rolled up on a supply roll 33, disposed for example above the stationary supporting surface 18, is drawn via a deflection roller 38 and inserted into the gap area 39 between the stationary supporting surface 18 and the free end 13 of the winding mandrel 12. There, the end of the inner film hose is threaded by the operator, preferably by hand, onto the free end 13 of the winding mandrel 12, and the drive motor of the drive device is turned on, which conveys the transport strips 16 against the feed direction of the liner hose indicated by arrow 36 during the winding process indicated in FIG. 2. The rotating transport strips 16 grab the inner side of the inner film hose 32 and move it over the winding mandrel 12 onto the support tube 8, where the hose is continuously pushed together and therefore stored. Once a desired length of the inner film hose 32, for example 50 m or more, has been drawn onto the support tube 8, the drive apparatus 16 is stopped, the inner film hose 32 is separated in a transverse direction below the supply roll 33, and the resulting free open end of the inner film hose 32 is pulled over the supporting surface 18 and inserted into the roller gap of a drive roller pair, not shown in more detail here, which moves the inner film hose 32 with the at least one wound-up fibrous strip 34 during the subsequent winding process in the feed direction 36.

Drawing the inner film hose 32 onto the support tube 8 can furthermore be supported in that the inner film hose 32 is moved on an air cushion over the winding mandrel 12 and/or the support tube 8. For such purpose, on the circumferential surface 14 of the support tube 8 or in the feed area of the winding mandrel 12, air outlet openings, not shown in more detail in the drawings, can be provided through which the blown air exits.

During the subsequent winding process which, for example, is described in the initially mentioned DE 19823714C2, the inner film hose 32 is then moved by the drive roller arrangement, not shown in more detail here, in the direction of the arrow 36 and, at the same time, the winding apparatus carrying the reference number 40 is activated. The same comprises, in addition to the apparatus 1 and the winding mandrel 12, a first and a second schematically indicated ring 42, which can be rotated by a motor, not shown in more detail herein, in the direction of the circumferential arrows, between which at least one shaft 44 is mounted, extending interlocking with the common axis of rotation of the two annular rings 42. A roll made from fibrous strip 34 is rotatably disposed on the shaft 44 with the fibrous strip being impregnated with a liquid reaction resin that can be cured, in particular, through radiation with UV light. As indicated in the representation according to FIG. 2, the fibrous strip 34 is wound up in a known manner to overlap the inner film hose 32 which is pulled off in the feed direction 26, as a result of which a liner hose 30 according to the invention is continuously created which can afterwards be wrapped with a non-light-permeable film before being inserted for curing into a pipe or a channel to be renewed.

LIST OF REFERENCE NUMBERS

1 Apparatus according to the invention
2 Floor element
4 Holding plate
6 Support element
8 Support tube
10 Free end of the support tube
12 Winding mandrel
13 Free end of the winding mandrel
14 Circumferential surface of the winding mandrel
16 Transport element
18 Stationary supporting surface
20 Rod-shaped tensioning element
20a Threaded section of the rod-shaped element
20b Threaded nut
22a First end of the rod-shaped winding element
22b Second end of the tensioning element
24 Front-side plate of the support tube
26 Height-adjustable support element/supporting roll
26a Drive wheel
27 Drive motor
28 Ground
30 Liner hose
32 Inner film hose
33 Supply roll
34 Fibrous strip
36 Feed direction
38 Deflection roller
39 Gap area
40 Winding apparatus
42 Annular rings of the winding apparatus
44 Axle to receive the fibrous strip roll
A Distance between the supporting surface and the free end of the winding mandrel
α Angle of inclination of the floor element in respect of the horizontal

The invention claimed is:

1. A method for producing a liner hose comprising:
   drawing an inner film hose against a feed direction, over a free end of a winding apparatus comprising a winding mandrel with a transport apparatus mounted on a free end of a cantilevered support tube wherein the inner film hose is circumferentially closed;
   transporting the inner film hose in a feed direction with the transport apparatus;
   circumferentially winding at least one fiber strip around the inner film hose while transporting the inner film hose in the feed direction, wherein the fiber strip is impregnated with a curable resin; and
   receiving the inner film hose with wound fiber strip on a stationary supporting surface proximate to a free end of the winding mandrel.

2. The method according to claim 1, wherein drawing the inner film hose against the feed direction further comprises the transport apparatus:
   engaging the inner film hose to move the inner film hose against the feed direction, and transport the inner film hose onto the support tube.

3. The method according to claim 2 wherein drawing the inner film hose against the feed direction further comprises:
   guiding the inner film hose from a supply roll over at least one deflection roller into a gap area located between the supporting surface and the free end of the winding mandrel.

4. The method according to claim 3, wherein an angle of inclination (α) of the support tube can be adjusted with respect to the horizontal.

5. The method according to claim 4, further comprising:
   adjusting a height of the support tube prior to drawing the inner film hose onto the support tube to increase the gap area between the supporting surface and the free end of the winding mandrel.

6. The method according to claim 5, further comprising:
   providing a cushion of air between the winding mandrel or support tube and the inner film hose to assist in moving the inner film hose.

7. The method according to claim 5, further comprising:
   providing a cushion of air between the winding mandrel and support tube, and the inner film hose to assist in moving the inner film hose.

8. A liner tube winding system, comprising:
   a substantially horizontally arranged floor element;
   a substantially vertically extending holding plate mounted to the floor element;
   at least one support element connected between the floor element and holding plate;
   a support tube having a mounted end and a free end wherein the mounted end is attached to the holding plate and extends in a cantilevered manner to the free end;
   a winding mandrel mounted to the free end of the support tube wherein the winding mandrel includes a rotatable transport apparatus accommodated in a circumferential surface; and
   at least one rod-shaped tensioning element extending through an inside portion of the support tube, wherein the rod has a first end attached to the support tube proximate the free end of the support tube and a second end attached to the holding plate.

9. The liner tube winding system according to claim 8, wherein the first end of the rod is attached to one of an inside wall or a front-side plate of the support tube proximate the free end of the support tube.

10. The liner tube winding system according to claim 9, further comprising:
    a plurality of height-adjustable support elements connected with the floor element to adjust the inclination (α) of the floor element with respect to the horizontal.

11. The liner tube winding system according to claim 10, wherein the floor element further comprises:
    at least one motor-driven drive wheel on the floor element for moving the liner tube winding system.

12. The liner tube winding system according to claim 11, wherein the rotatable transport apparatus further comprises an electrical drive motor whose direction of rotation can be reversed to reverse the feed direction.

13. The liner tube winding system according to claim 12, further comprising:
    a stationary supporting surface positioned proximate the free end of the winding mandrel and defining a gap area between the stationary supporting surface and the free end of the winding mandrel.

14. The liner tube winding system according to claim 13, further comprising:
    a supply roll located proximate the stationary supporting surface adapted to supply the inner film hose; and
    at least one deflection roller proximate the gap area between the stationary supporting surface and a free end of the winding mandrel to guide the inner film hose.

* * * * *